United States Patent Office 3,801,600
Patented Apr. 2, 1974

---

3,801,600
OLFACTORY DIOXOLANE DERIVATIVES AND COMPOSITIONS CONTAINING SAME
Peter Naegeli, Unter-Ehrendingen, Switzerland, assignor to Givaudan Corporation, Clifton, N.J.
No Drawing. Filed Dec. 30, 1970, Ser. No. 102,987
Claims priority, application Switzerland, Jan. 9, 1970, 242/70
Int. Cl. C07d 13/00
U.S. Cl. 260—340.5    9 Claims

ABSTRACT OF THE DISCLOSURE

Dioxolanes wherein the dioxolane ring is fused to a saturated or unsaturated 12-membered hydrocarbon ring, and constituting a novel series of olfactory agents, useful in perfumes, cosmetics, detergents, soaps, etc.

FIELD OF THE INVENTION

Novel compounds having mushroom-like, earthy to woody or woody-amber-like odors.

DESCRIPTION OF THE PRIOR ART

There is described in the Bull. Chem Soc. Jap., 36, p. 1390 (1963) a compound having the following formula:

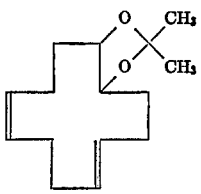

This compound is so devoid of odor qualities as to be of no practical interest in perfumery.

SUMMARY OF THE INVENTION

The present invention is concerned with new olfactory compounds of the general formula

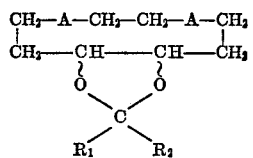

wherein A signifies a —$CH_2$—$CH_2$— or —CH=CH— group, $R_1$ and $R_2$ independently of each other signify hydrogen and alkyl containing 1–3 C (such as methyl, ethyl, propyl, isopropyl) and $R_1$ together with $R_2$ signifies tri- or tetramethylene, and where the two A symbols represent —CH=CH— groups, one of these ethylene groups should display trans configuration and the other should display cis or trans configuration and where, moreover, in the case of cis-trans configuration of the two ethylene bonds, the two oxygen atoms of the dioxolane ring should be translocated.

The sub-groups comprehended by the above definition of Formula I can be represented by the following Formulae IA–IE:

(a) Saturated cis-1,3-dioxolanes of the general formula

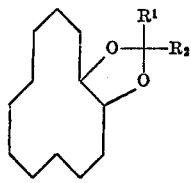

IA (b) Saturated trans - 1,3 - dioxolanes of the general formula

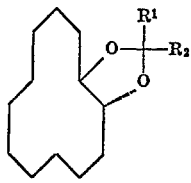

IB (c) trans-trans-diene-cis-dioxolanes of the general formula

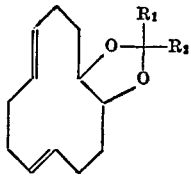

IC (d) Trans-trans-diene-trans-dioxolanes of the general formula

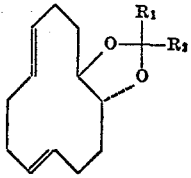

ID (e) Cis-trans-diene-trans-dioxolanes of the general formula

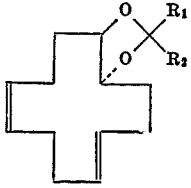

IE

In the above Formulae IA–IE, $R_1$ and $R_2$ have the significance given earlier.

DESCRIPTION OF THE PREFERRED EMBODIMENTS

The new compounds of General Formula I can be manufactured in accordance with the invention by (a) Subjecting a glycol of the general formula

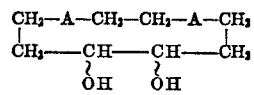

II wherein

A is as above and where, in case the two A symbols represent —CH=CH— groups, one of these ethylene groups should display trans configuration and the other should display cis or trans configuration and where, moreover, in case of cis-trans configuration of the two ethylene bonds, the two hydroxy groups should be trans-located, to acid-catalyzed cyclization with a compound of the general formula

III wherein R₁ and R₂ signify the same as above or by
(b) Subjecting a compound of the general formula

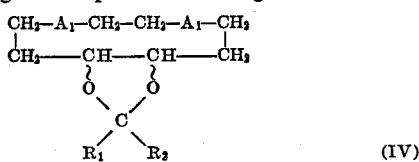

(IV)

wherein the two symbols A₁ signify —CH=CH— groups and R₁ as well as R₂ signify the same as above, to catalytic hydrogenation for the purpose of producing a saturated compound of General Formula I (i.e. compounds of General Formulae IA and IB).

The wavy bonds leading to the oxygen atoms are meant to express that the Formulae I, II and IV comprehend both cis- and trans-dioxolanes and cis- and trans-glycols.

The saturated compounds of General Formulae IA and IB can accordingly be obtained from saturated glycols of Formulae IIA and IIB respectively

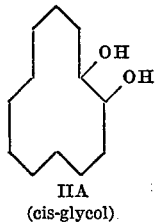 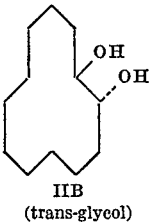

IIA (cis-glycol)       IIB (trans-glycol)

in accordance with process variant (a) or by catalytic hydrogenation of diene-dioxolanes of General Formula IV in accordance with process variant (b). Thus, the Compounds IA can, for example, be obtained by hydrogenation of dienes of General Formula IC or of those of the general formula

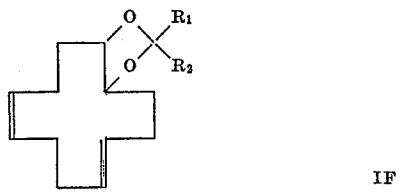

IF wherein R₁ and R₂ signify the same as above, and the Compounds IB can, for example, be produced by hydrogenation of the dienes ID or IE.

The unsaturated Compounds IC, ID and IE can be manufactured from the corresponding unsaturated glycols IIC, IID and IIE respectively

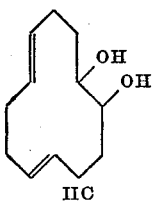 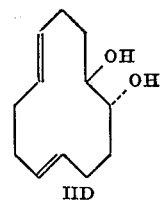 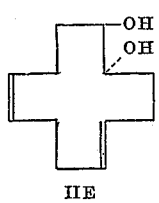

IIC (trans-trans-diene-cis-glycol)   IID (trans-trans-diene-trans-glycol)   IIE (cis-trans-diene-trans-glycol)

in accordance with process variant (a).

The acid-catalyzed cyclization according to process variant (a) can be undertaken according to the usual methods of ketalization or acetalization of ketones or aldehydes with 1,2-glycols. As acidic catalysts there can, for example, be used mineral acids, organic sulphonic acids (such as p-toluenesulphonic acid) or copper (II) sulphate. The reaction of the glycol II with the aldehyde or ketone III is expediently effected using an excess of carbonyl Compound III at temperatures between about 0 and 100° C., preferably at about room temperature. The reaction can be carried out with or without addition of solvents (such as aromatic or halogenated aliphatic hydrocarbons) as well as with or without addition or water-binding agents (such as sodium sulphate, magnesium sulphate, Alox, silica gel, etc.). The starting glycols II are known compounds.

The hydrogenation in the sense of process variant (b) can likewise be undertaken according to methods which are known per se. As hydrogenation catalysts there can, for example, be mentioned palladium, platinum and Raney-nickel.

The compounds of General Formula I in accordance with the invention are distinguished by interesting odor properties, on the basis of which they can be used for perfumery purposes such as manufacture of odorant compositions (e.g. perfumes) or for perfuming products of all kinds (e.g. cosmetic products such as soaps, creams and further toilet articles, or household detergents such as washing powders). The content of the compounds of this invention in odorant compositions or in the perfumed products can vary within wide limits, for example between 0.1 to 15 wt. percent, the preferred range being from about 0.5% to 10%. In soaps, the weight percent is from 1 to 2%, in lotions and bath salts the corresponding amounts are 2 to 3% and 0.3 to 5% respectively of such odorant compositions.

The fragrance notes of the compounds of General Formula I can be characterized as mushroom-like, earthy to purely woody or woody-amber-like.

Cis-dodecahydro-2-methyl-cyclododeca[d] - 1,3-dioxol (Formula IA: R₁=H, R₂=CH₃) and trans-3a,4,5,8,9,12,13,13a-octahydro - 2,2 - dimethyl-6-cis,10-trans-cyclododeca[d]-1,3-dioxol (Formula IE: R₁=CH₃, R₂=CH₃) are distinguished by particular odor qualities.

EXAMPLE 1

8.8 g. of cis-3a,4,5,8,9,12,13,13a-octahydro-2-methyl-6-cis, 10-trans-cyclododeca[d]-1,3-dioxol dissolved in 100 ml. of pure ethanol were stirred in a hydrogen atomsphere in the presence of 500 mg. of 5 percent palladium-charcoal or 5 percent palladium on calcium carbonate until the uptake of hydrogen was completed. After filtration of the solution and evaporation of the solvent, there remained an oil which was distilled at 70° C./0.001 mm./Hg. The colorless distillate (98% yield) is pure cis-dodecahydro-2 - methyl-cyclododeca[d] - 1,3 - dioxol (Formula IA: R₁=H, R₂=CH₃). Odor: woody, green, fruity.

IR$_{Film}$: 1170, 1140, 1100 cm.⁻¹.

NMR$_{CDCl_3}$: q. (1H) at δ=5.00 and 5.30 p.p.m.; m. (2H) at δ=3.96 p.p.m.

The dioxolane used as the starting material was obtained from the corresponding diol as follows:

30 g. of 5-cis, 9-trans-cyclododecadiene-1,2-cis-diol, 600 g. of paraldehyde, 1.5 g. of paratoluenesulphonic acid and 6 g. of anhydrous magnesium sulphate were intensively stirred at room temperature for two days. The reaction mixture was then poured onto cold dilute bicarbonate solution and exhaustively extracted with hexane. After washing neutral and drying the hexane phases, the solution was concentrated and filtered on the 15-fold amount of aluminium oxide. The colorless eluate (25 g.) was distilled at 100° C./0.001 mm./Hg and represents pure cis-3a,4,5,8,9,12,13,13a - octahydro - 2 - methyl-6-cis, 10-trans-cyclododeca[d]-1,3-dioxol.

EXAMPLE 2

5 g. of trans-cyclododecane-1,2-diol, 300 mg. of paratoluenesulphonic acid and 50 ml. of pure acetone were stirred overnight at room temperature. The reaction solution was then poured onto cold dilute bicarbonate solution and extracted with hexane. After washing with water and drying with anhydrous sodium sulphate, the hexane phase was evaporated and the oily crude product filtered as a hexane solution on the 10-fold amount by weight of neutral aluminium oxide (Woelm, act. II). The eluate was evaporated and distilled at 65° C./0.001 mm. Hg. The 4.5 g. of colorless distillate are pure trans-dodecahydro-2,2-dimethylcyclo - dodeca[d] - 1,3 - dioxol (Formula IB: $R_1=CH_3$, $R_2=CH_3$). Odor: Woody.

$IR_{Film}$: 1385, 1375, 1245, 1100, 1070, 1045 cm.$^{-1}$.

$NMR_{CDCl_3}$: m. (2H) at $\delta=3.75-4.00$ p.p.m.; s. (each 3H) at $\delta=1.33-1.37$ p.p.m.

EXAMPLE 3

6 g. of 5-trans, 9-trans-cyclododecadiene-1,2-cis-diol, 200 mg. of para-toluenesulphonic acid, 1 g. of anhydrous magnesium sulphate and 150 ml. of paraldehyde were intensively stirred at room temperature for 3 days. The reaction mixture was then poured onto cold dilute bicarbonate solution and this extracted three times with hexane. The hexane phase were intensively washed with water. After drying and evaporation of the solvent, the oily crude product was filtered, in the form of a hexane solution, directly on the 15-fold amount by weight of neutral aluminium oxide (Woelm, act. II). The colorless eluate (4.5 g.) was directly distilled at 80° C./0.001 mm. Hg and represents pure cis - 3a,4,5,8,9,12,13a - octahydro-2-methyl-6-trans, 10 - trans - cyclododeca[d] - 1,3 - dioxol (Formula IC: $R_1=H$, $R_2=CH_3$). Odor: Woody, amber-like.

$IR_{Film}$: 1140, 1130, 1085/1075/975 cm.$^{-1}$.

NMR: m. (4H) at $\delta=4.95-5.4$ p.p.m.; m. (2H) at $\delta=3.8-4.2$ p.p.m.; d. (3H) at $\delta=1.37$ and 1.30 (J.=5 c.p.s.).

EXAMPLE 4

4 g. of 5-trans, 9-trans-cyclododecadiene-1,2-trans-diol, 300 mg. of para-toluenesulphonic acid and 40 ml. of pure acetone were stirred overnight at room temperature. The reaction solution was then poured onto cold dilute bicarbonate solution and extracted with hexane. After washing with water and drying with anhydrous magnesium sulphate, the hexane phase was concentrated and filtered on 40 g. of neutral aluminium oxide (Woelm, act. II). The eluates were combined, evaporated and distilled at 65° C./0.001 mm. Hg. The 3 g. of colorless liquid represent pure trans - 3a,4,5,8,9,12,13,13a - octahydro - 2,2 - dimethyl-6-trans, 10 -trans - cyclododeca[d] - 1,3 - dioxol (Formula ID: $R_1=CH_3$, $R_2=CH_3$). Odor: Woody, amber-like, fatty.

$IR_{Film}$: 1380, 1370, 1240, 1220, 1170, 1130, 1090, 1060, 1025, 1010, 970, 878 cm.$^{-1}$.

$NMR_{CDCl_3}$: m. (4H) at $\delta=5.20-5.40$ p.p.m.; m. (2H) at $\delta=3.90-4.15$ p.p.m.; s. (6H) at $\delta=1.40$ p.p.m.

EXAMPLE 5

5 g. of 5-cis, 9-trans-cyclododecadiene-1,2-trans-diol, 300 mg. of para-toluenesulphonic acid, 50 ml. of cyclopentanone and 20 ml. of chloroform were intensively stirred at room temperature for 24 hours. The reaction solution was poured onto ice-cold dilute bicarbonate solution and exhaustively extracted with hexane. After washing and drying of the hexane phase, the solvent was evaporated off and the oily crude product directly distilled at 90° C./0.001 mm. Hg. The liquid colorless distillate (5.8 g.) represents pure 6-cis, 10-trans-3a,4,5,8,9,12,13,13a-octahydrospiro(trans-cyclododeca[d]-1,3-dioxol - 2,1' - cyclopentane) (Formula IE:

$R_1+R_2=$ —$CH_2$—$CH_2$—$CH_2$—$CH_2$—)

Odor: Weakly woody, green.

$IR_{Film}$: 1665, 1340, 1210, 1115, 1050, 980, 742, 723, 706 cm.$^{-1}$.

$NMR_{CDCl_3}$: m. (4H) at $\delta=5.1-5.7$ p.p.m.; m. (2H) at $\delta=3.7-4.0$ p.p.m.

EXAMPLE 6

5 g. of 5-cis, 9-trans-cyclododecadiene-1,2-trans-diol, 300 mg. of para-toluenesulphonic acid, 3 g. of paraformaldehyde, 50 ml. of benzene and 50 ml. of methylene chloride were intensively stirred at 60° C. (bath-temperature) for 3 days. The reaction mixture was thereupon poured onto cold, dilute bicarbonate solution and exhaustively extracted with hexane. After washing and drying the hexane phase, the solvent was evaporated. The crude material (5.8 g.) was filtered as a hexane solution through the 10-fold amount by weight of neutral aluminum oxide (Woelm, act. II) and, after evaporation, the hexane eluate was distilled at 60° C./0.001 mm. Hg. The colorless liquid distillate represents pure trans - 3a,4,5,8,9,12,13,13a-octahydro-6-cis, 10-trans-cyclododeca[d]-1,3-dioxol (Formula IE: $R_1=H$, $R_2=H$). Odor: Woody, earthy.

$IR_{Film}$: 1665, 1450, 1100, 980, 740, 706 cm.$^{-1}$.

$NMR_{CDCl_3}$: m. (4H) at $\delta=5.1-5.7$ p.p.m.; s. (2H) at $\delta=4.95$ p.p.m.; m. (2H) at $\delta=3.65-4.05$ p.p.m.

EXAMPLE 7

Trans - 3a,4,5,8,9,12,13,13a-octahydro - 2,2 - dimethyl-6-cis, 10 - trans-cyclododeca[d]-1,3-dioxol (Formula IE: $R_1=CH_3$, $R_2=CH_3$)

10 g. of 5-cis, 9-trans-cyclododecadiene-1,2-trans-diol were stirred for 24 hours at room temperature in 100 ml. of absolute acetone together with 300 mg. of p-toluenesulphonic acid as catalyst. The reaction mixture was poured onto ice-water, the resulting mixture was thoroughly extracted with ether, the combined ethereal extracts were washed with bicarbonate solution and then with water, then dried and finally, the solvent was evaporated. The crude material was dissolved in hexane and filtered through the 10-fold amount (by weight) of alumina. The eluate was concentrated and gave, on distillation, 10 g. of pure trans-3a,4,5,8,9,12,13,13a-octahydro-2,2-dimethyl-6-cis, 10-trans-cyclododeca[d]-1,3-dioxol.

EXAMPLE 8

Trans - 3a,4,5,8,9,12,13,13a-octahydro - 2 - methyl-6-cis, 10 - trans-cyclododeca[d] - 1,3 - dioxol (Formula IE: $R_1=H$, $R_2=CH_3$); odor: woody, amber-like, fresh 5 g. of 5-cis, 9 - trans-cyclododecadiene-1,2-trans-diol were stirred for 24 hours at room temperature together with 300 mg. of p-toluenesulfonic acid in 50 g. of paraldehyde. The mixture was poured onto ice-water and the resulting mixture thoroughly extracted with hexane; the combined hexane layers were washed with saturated sodium carbonate solution and then with water, the organic phase was dried and the solvent evaporated off. The crude product was dissolved in hexane and filtered through the 10-fold amount (by weight) of alumina. The eluate was concentrated and then distilled in high - vacuum. There were obtained 4.8 g. of pure trans-3a,4,5,8,9,12,13,13a-octahydro-2-methyl-6-cis, 10-trans-cyclododeca[d] - 1,3-dioxol.

In a manner analogous to the teachings of the foregoing examples, as will be understood by those skilled in the art, the compounds of the foregoing examples, Nos. 9 to 14 inclusive were prepared.

EXAMPLE 9

Trans - 3a,4,5,8,9,12,13,13a - octahydro - 2 - methyl-2-ethyl-6-cis, 10-trans-cyclododeca[d] - 1,3 - dioxal (Formula IE: $R_1=CH_3$, $R_2=C_2H_5$). Odor: weakly woody.

EXAMPLE 10

Trans - 3a,4,5,8,9,12,13,13a - octahydro-2,2-diethyl-6-cis, 10-trans-cyclododeca[d] - 1,3 - dioxol (Formula IE: $R_1=C_2H_5$, $R_2=C_2H_5$). Odor: weakly woody.

EXAMPLE 11

Trans - dodecahydro - 2 - methyl-cyclododeca[d]-1,3-dioxol (Formula IB: $R_1=H$, $R_2=CH_3$). Odor: earthy, woody, patchouli-like.

EXAMPLE 12

Trans - 3a,4,5,8,9,12,13,13a - octahydro - 2 - methyl-6-trans, 10-trans-cyclododeca[d]-1,3-dioxol (Formula ID: $R=H$, $R_2=CH_3$). Odor: cedarwood-like, amber-like.

EXAMPLE 13

Cis - dodecahydro - 2,2 - dimethylcyclododeca[d]-1,3-dioxol (Formula IA: $R_1=CH_3$, $R_2=CH_3$). Odor: woody, sweetish.

EXAMPLE 14

Cis - 3a,4,5,8,9,12,13,13a - octahydro-2,2-dimethyl-6-trans, 10-trans-cyclododeca[d]-1,3-dioxol (Formula IC: $R_1=CH_3$, $R_2=CH_3$). Odor: woody, fruity.

Analytical data relative to the compounds prepared in accordance with Exemples 1 through 14 follows.

Compound of Example 1:
 C calc.: 74.28%; H calc.: 11.58%.
 C found: 74.03%; H found: 11.50%.

Compound of Example 2:
 C calc.: 74.95%; H calc.: 11.74%.
 C found: 74.96%; H found: 11.80%.

Compound of Example 3:
 MS: M/e=222; m/e=207, 178, 161, 149, 139, 134, 126, 119, 109, 95, 81, 79, 71, 67, 54, 41.

Compound of Example 4:
 C calc.: 76.22%; H calc.: 10.24%.
 C found: 76.35%; H found: 10.38%.

Compound of Example 5:
 C calc.: 77.82%; H calc.: 99.99%.
 C found: 77.82%; H found: 9.92%.

Compound of Example 6:
 C calc.: 74.98%; H calc.: 9.68%.
 C found: 74.62%; H found: 9.85%.

Compound of Example 7:
 $n_D^{20}=1.4932$.
 B.P. ~70°/0.01/mm. Hg.
 C calc.: 76.22%; H calc.: 10.24%.
 C found: 76.56%; H found: 10.09%.
 $IR_{Film}$: 1660, 1382, 1375, 1258, 1242, 1220, 1170, 1100, 1070, 1060, 975, 875, 740, 720 cm.$^{-1}$.
 $NMR_{CDCl_3}$: m. (4H) at $\delta=5.0$–5.8 p.p.m.; m. (2H) at $\delta=3.7$–4.1 p.p.m.; s. (6H) at $\delta=1.38$ p.p.m.

Compound of Example 8:
 B.P. 70° C./0.001 mm. Hg.
 $n_D^{20}=1.4493$.
 C calc.: 75.65%; H calc.: 9.97%.
 C found: 75.77%; H found: 10.00%.
 $IR_{Film}$: 1662, 1420, 1390, 1190, 1150, 1138, 1102, 1040, 990, 980, 890, 855, 740, 705 cm.$^{-1}$.
 $NMR_{CDCl_3}$: m. (4H) at $\delta=5.0$–5.8 p.p.m.; 2 q. (2H, J.=5 c.p.s.) at $\delta=5.12$ and 5.08 p.p.m.; m. (2H) at $\delta=3.64$–4.15 p.p.m.; d. (3H, J.=5 c.p.s.) at $\delta=1.32$ p.p.m.

Compound of Example 9:
 B.P. 80° C./0.001 mm. Hg.
 C calc.: 76.75%; H calc.: 10.47%.
 C found: 76.67%; H found: 10.43%.
 $IR_{Film}$: 1660, 1380, 1240, 1200, 1100, 1070, 990, 980, 900, 890, 740, 720 cm.$^{-1}$.
 $NMR_{CDCl_3}$: m. (4H) at $\delta=5.8$–5.9 p.p.m.; m. (2H) at $\delta=3.65$–4.15 p.p.m.; s. (3H) at $\delta=1.30$ p.p.m.; t. (3H, J.=7 c.p.s.) at $\delta=0.9$ p.p.m.

Compound of Example 10:
 B.P. 85° C./0.001 mm. Hg.
 C calc.: 77.22%; H calc.: 10.67%.
 C found: 77.30%; H found: 10.87%.
 $IR_{Film}$: 1660, 1360, 1280, 1178, 1140, 1100, 1080, 1060, 1042, 995, 978, 935, 740, 722 cm.$^{-1}$.
 $NMR_{CDCl_3}$: m. (4H) at $\delta=5.0$–5.9 p.p.m.; m. (2H) at $\delta=3.75$–4.1 p.p.m.; q. (4H, J.=7 c.p.s.) at $\delta=1.62$ p.p.m.; t. (6H, J.=7 c.p.s.) at $\delta=0.90$ p.p.m.

Compound of Example 11:
 M.P. 53–54° C.
 C calc.: 74.28%; H calc.: 11.58%.
 C found: 73.99%; H found: 11.58%.
 $IR_{Film}$: 1422, 1392, 1240, 1170, 1150, 1105, 1010, 880, 875, 700 cm.$^{-1}$.
 $NMR_{CDCl_3}$: q. (1H, J.=5 c.p.s.) at $\delta=5.18$ p.p.m; m. (2H) at $\delta=3.75$–4.15 p.p.m.; d. (3H, J.=5 c.p.s.) at $\delta=1.35$ p.p.m.

Compound of Example 12:
 B.P. 65° C./0.001 mm. Hg.
 C calc.: 75.63%; H calc.: 9.97%.
 C found: 75.61%; H found: 10.15%.
 $IR_{Film}$: 1678, 1420, 1395, 1190, 1150, 1125, 1100, 1025, 975, 882 cm.$^{-1}$.
 $NMR_{CDCl_3}$: m. (4H) at $\delta=4.9$–5.6 p.p.m.; q. (1H, J.=5 c.p.s.) at $\delta=5.15$ p.p.m.; m. (2H) at $\delta=3.75$–4.30 p.p.m.; d. (3H, J=5 c.p.s.) at $\delta=1.37$ p.p.m.

Compound of Example 13:
 B.P. 70° C./0.001 mm. Hg.
 C calc.: 74.95%; H calc.: 11.74%.
 C found: 74.77%; H found: 11.91%.
 $IR_{Film}$: 1375, 1365, 1242, 1220, 1070, 1048, 870 cm.$^{-1}$.
 $NMR_{CDCl_3}$: m. (2H) at $\delta=3.80$–4.30 p.p.m.; s. (3H) at $\delta=1.40$ p.p.m.; s. (3H) at $\delta=1.32$ p.p.m.

Compound of Example 14:
 B.P. 80° C./0.001 mm. Hg.
 MS: M/e=236; m/e=221, 179, 161, 153, 149, 140, 135, 119, 109, 105, 93, 85, 81, 79.
 $IR_{Film}$: 1665, 1375, 1365, 1245, 1215, 1162, 1075, 1055, 1038, 975, 865 cm.$^{-1}$.
 $NMR_{CDCl_3}$: m. (4H) at $\delta=4.9$–5.7 p.p.m.; m. (2H) at $\delta=3.8$–4.3 p.p.m.; s. (3H) at $\delta=1.45$ p.p.m.; s. (3H) at $\delta=1.35$ p.p.m.

EXAMPLE 15

Composition (fantasy note)

| | Parts by weight |
|---|---|
| Cis - dodecahydro - 2-methyl-cyclododeca[d]-1,3-dioxol (Formula Ia: $R_1=H$, $R_2=CH_3$) | 30 |
| Vanillin | 10 |
| Coumarin | 10 |
| Piperonal | 20 |
| Isocinnamyl alcohol | 20 |
| Beta-ionone | 50 |
| Alpha-ionone | 100 |
| 1,1,3,3,5-pentamethyl-4,6-dinitroindane | 30 |
| p-Tert-butyl-cyclohexyl acetate | 70 |
| Sandalwood oil, East-Indian | 20 |
| Vetivenyl acetate | 40 |
| Benzoic Siam resinoid | 20 |
| Eugenol | 30 |
| Pimento oil | 40 |
| Isobutyl salicylate | 80 |
| Iris resinoid | 20 |
| Mimosa absolue (10% in phthalic acid diethyl ester) | 40 |
| Hydroxycitronellal | 70 |
| Ylang Ylang oil absolue | 20 |
| Rose de mai synth. | 50 |
| Gamma-undecalactone (1% in phthalic acid diethyl ester) | 30 |
| Benzyl acetate | 50 |
| Decyl aldehyde (1% in phthalic acid diethyl ester) | 20 |
| Orange oil Ital. | 30 |
| Bergamotte oil Reggio | 70 |
| | 1000 |

EXAMPLE 16

The addition of trans - 3a,4,5,8,9,12,13,13a-octahydro-2,2-dimethyl - 6 - cis, 10-trans-cyclododeca[d]-1,3-dioxol (Formula IE: $R_1=CH_3$, $R_2=CH_3$) in an amount of 1–2 wt. percent to the following odorant composition has exalting action, i.e. brings about an improvement and rounding off of the floral character thereof.

| | Parts by weight |
|---|---|
| Citronellol laevo | 50 |
| Phenylethyl alcohol | 50 |
| Lavandulol | 20 |
| Lemon oil Spanish | 20 |
| Linalyl acetate | 20 |
| Hydroxycitronellal | 70 |
| α-Methyl-β-(p-tert. butylphenyl)-propionaldehyde | 30 |
| Benzyl propionate | 80 |
| Indole (10% in phthalic acid diethyl ester) | 10 |
| Ylang Ylang oil Bourbon | 20 |
| p-Tert-butql-cyclohexyl acetate | 40 |
| Alpha-methylionone | 50 |
| Musk ketone | 30 |
| Musk ambrette | 20 |
| Piperonal | 30 |
| Coumarin | 10 |
| Civet nat. defatted (10% in phthalic acid diethyl ester) | 20 |
| Jasmin synthetic | 40 |
| Geranium oil Bourbon | 10 |
| Neroli oil synthetic | 10 |
| Undecylenaldehyde (10% in phthalic acid diethyl ester) | 20 |
| Jasmonyl Givaudan (isomeric mixture of nonane-1,3-diol monoacetates) | 30 |
| Gamma-undecalactone (1% in phthalic acid diethyl ester) | 20 |
| | 700 |

What is claimed is:

1. A compound of the formula

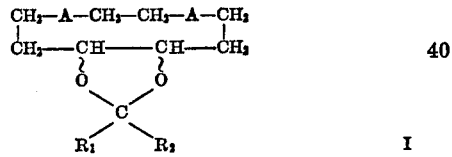

I wherein A signifies a —$CH_2$—$CH_2$— or —CH=CH— group, $R_1$ and $R_2$ independently of each other signify hydrogen or alkyl containing 1–3 C and $R_1$ together with $R_2$ signifies tri- or tetramethylene, and where, in case the two A symbols represents —CH=CH— groups, one of these ethylene groups has trans configuration and the other has cis or trans configuration, and where, in case of cis-trans configuration of the two ethylene bonds, the two oxygen atoms of the dioxolane ring are trans-located.

2. A cis-dioxolane in accordance with claim 1, having the formula

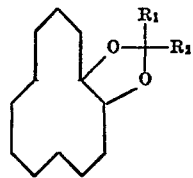

IA

3. A trans-dioxolane in accordance with claim 1, having the formula

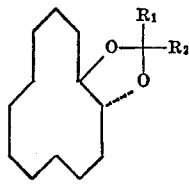

IB

4. A trans-trans-diene-cis-dioxolane in accordance with claim 1, having the formula

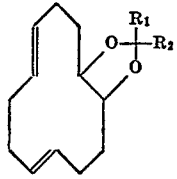

IC

5. A trans-trans-diene-trans-dioxolane in accordance with claim 1, having the formula

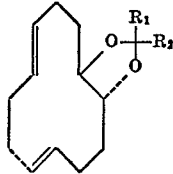

ID

6. A cis-trans-diene-trans-dioxolane in accordance with claim 1, having the formula

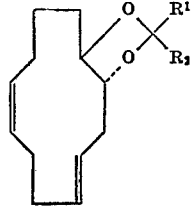

IE

7. A compound in accordance with claim 1, having the formula: cis - dodecahydro-2-methyl-cyclododeca[d]-1,3-dioxol.

8. A compound in accordance with claim 1, having the formula: trans - 3a,4,5,8,9,12,13,13a-octahydro-2,2-dimethyl-6-cis, 10-trans-cyclododeca[d]-1,3-dioxol 9. A compound in accordance with claim 1, having the formula: trans-3a,4,5,8,9,12,13,13a-octahydro-2-methyl-6-cis, 10-trans-cyclododeca[d]-1,3-dioxol.

References Cited

Takahasi: "Chemical Abstracts," vol. 60 (1964), col. 3998h–99a.

Takahasi: "Chemical Abstracts," vol. 67 (1967), col. 53755q.

DONALD G. DAUS, Primary Examiner

J. H. TURNIPSEED, Assistant Examiner

U.S. Cl. X.R.

252—522